(12) United States Patent
Bruhn

(10) Patent No.: US 6,452,941 B1
(45) Date of Patent: Sep. 17, 2002

(54) METHOD AND SYSTEM FOR ALTERNATING TRANSMISSION OF CODEC MODE INFORMATION

(75) Inventor: Stefan Bruhn, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/154,046

(22) Filed: Sep. 16, 1998

(51) Int. Cl.[7] .................................................. H04J 3/16
(52) U.S. Cl. ...................... 370/468; 370/337; 370/347; 370/441
(58) Field of Search ................................. 370/465, 468, 370/437, 321, 336, 337, 347, 395.64, 395.65, 458

(56) References Cited

U.S. PATENT DOCUMENTS

| | | | |
|---|---|---|---|
| 5,007,047 A | | 4/1991 | Sridhar et al. .............. 370/32.1 |
| 5,577,087 A | | 11/1996 | Furuya ........................ 375/377 |
| 5,757,813 A | * | 5/1998 | Raith .......................... 371/5.5 |
| 6,108,560 A | * | 8/2000 | Navaro et al. .............. 455/517 |
| 6,167,060 A | * | 12/2000 | Vargo et al. ................ 370/468 |

FOREIGN PATENT DOCUMENTS

| | | |
|---|---|---|
| EP | 423485 | 4/1991 |
| EP | 790713 | 8/1997 |
| EP | 794631 | 9/1997 |
| EP | 827312 | 4/1998 |
| EP | 863682 | 9/1998 |
| EP | 0 964 540 A2 * 12/1999 | ........... H04B/17/00 |
| WO | WO95/28814 | 10/1995 |
| WO | WO97/41549 | 11/1997 |

OTHER PUBLICATIONS

European Search Report re RS 101708 Date of mailing of search: Apr. 29, 1999.

* cited by examiner

Primary Examiner—Alpus H. Hsu
Assistant Examiner—Thien Tran
(74) Attorney, Agent, or Firm—Burns, Doane, Swecker & Mathis, L.L.P.

(57) ABSTRACT

A communication system supports multiple source coding/channel coding schemes. A mode indicator can be transmitted with payload data to inform the receiver of the particular scheme currently being employed. Similarly, a mode request can be transmitted to inform the receiver of a particular scheme to be employed for information to be transmitted on the return radio link. The rate of change of the mode indications and mode requests can be decimated so that they need not both be transmitted in each frame to thereby reduce the overhead capacity consumption associated with the transmission of mode information. According to one exemplary embodiment, the mode indication and the mode request can be transmitted independently on alternating frames.

48 Claims, 7 Drawing Sheets

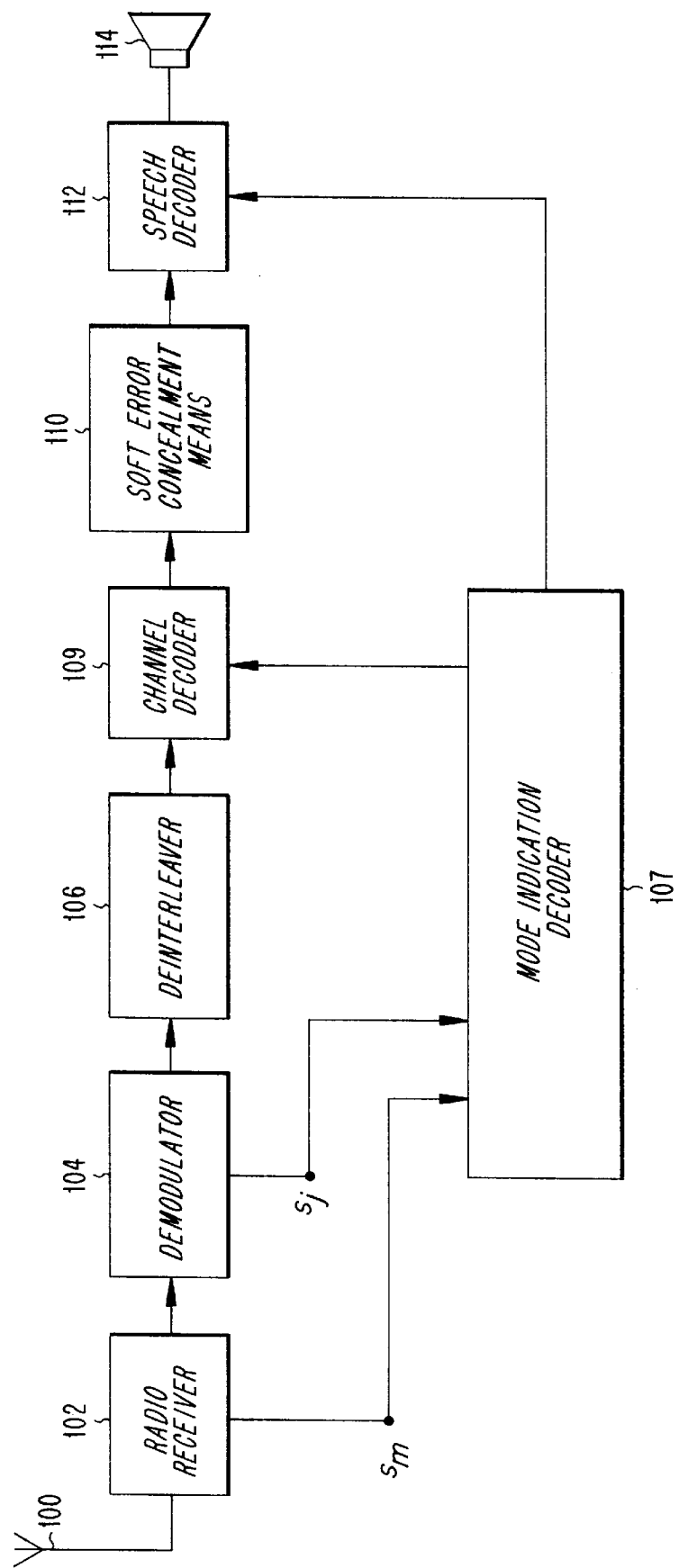

METHOD AND SYSTEM FOR ALTERNATING TRANSMISSION OF CODEC MODE INFORMATION

RELATED APPLICATION

This application is related to U.S. Pat. No. 6,256,487, entitled "Multiple Mode Transmitter Using Multiple Speech/Channel Coding Modes Wherein the Coding Mode is Conveyed to the Receiver with the Transmitted Signal" to Stefan Bruhn, filed on Sep. 1, 1998, the disclosure of which is expressly incorporated here by reference.

BACKGROUND

The present invention generally relates to mode handling in the field of communication systems and, more particularly, to handling the transmission of information associated with requesting and identifying coding modes in digital communication systems that support multiple speech/forward error correction coding schemes.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems wherein analog modulation was used to impress data onto a carrier wave, to systems wherein digital modulation was used to impress the data on carrier waves.

In wireless digital communication systems, standardized air interfaces specify most of the system parameters, including speech coding type(s), burst format, communication protocol, etc. For example, the European Telecommunication Standard Institute (ETSI) has specified a Global System for Mobile Communications (GSM) standard that uses time division multiple access (TDMA) to communicate control, voice and data information over radio frequency (RF) physical channels or links using a Gaussian Minimum Shift Keying (GMSK) modulation scheme at a symbol rate of 271 ksps. In the U.S., the Telecommunication Industry Association (TIA) has published a number of Interim Standards, such as IS-54 and IS-136, that define various versions of digital advanced mobile phone service (D-AMPS), a TDMA system that uses a differential quadrature phase shift keying (DQPSK) modulation scheme for communicating data over RF links.

TDMA systems subdivide the available frequency into one or more RF channels. The RF channels are further divided into a number of physical channels corresponding to timeslots in TDMA frames. Logical channels are formed of one or several physical channels where modulation and coding is specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. In fact, some systems now employ code division multiple access (CDMA), using a form of spread spectrum modulation wherein signals intentionally share the same time and frequency. Although digital techniques provide a greater number of useful channels from a given frequency spectrum, there still remains a need to maintain interference at acceptable levels, or more specifically to monitor and control the ratio of the carrier signal strength to interference, (i.e., carrier-to-interference (C/I) ratio).

Another factor which is increasingly important in providing various communication services is the desired/required user bit rate for data to be transmitted over a particular connection. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation, and resource allocation, e.g., for a TDMA system, this latter technique may refer to the number of assignable time slots per connection, for a CDMA system, this latter parameter may refer to the number of assignable codes per connection.

Speech coding (or more generally "source coding" to include techniques associated with the compression of data) techniques are used to compress the input information into a format which uses an acceptable amount of bandwidth but from which an intelligible output signal can be reproduced. Many different types of speech coding algorithms exist, e.g., residual excited linear predictive (RELP), regular-pulse excitation (RPE), etc., the details of which are not particularly relevant to this invention. More significant in this context is the fact that various speech coders have various output bit rates and that, as one would expect, speech coders having a higher output bit rate tend to provide greater consumer acceptance of their reproduced voice quality than those having a lower output bit rate. As an example, consider that more traditional, wire-based telephone systems use PCM speech coding at 64 kbps, while GSM systems employ an RPE speech coding scheme operating at 13 kbps.

In addition to speech coding, digital communication systems also employ various techniques to handle erroneously received information. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding (collectively referred to herein as "channel coding") of the data prior to modulation. Channel coding involves representing a certain number of data bits using a certain number of code bits. Thus, for example, it is common to refer to convolutional codes by their code rates, e.g., ½ and ⅓, wherein the lower code rates provide greater error protection but lower user bit rates for a given channel bit rate.

Conventionally, each of the techniques which impacted the user bit rate were fixed for any given radiocommunication system, or at least for the duration of a connection established by a radiocommunication system. That is, each system established connections that operated with one type of speech coding, one type of channel coding, one type of modulation and one resource allocation. More recently, however, dynamic adaptation of these techniques as become a popular method for optimizing system performance in the face of the numerous parameters which may vary rapidly over time, e.g., the radio propagation characteristics of radiocommunication channels, the loading of the system, the user's bit rate requirements, etc.

For example, different modulations have been dynamically assigned to selectively take advantage of the strengths of individual modulation schemes and to provide greater user bit rates and/or increased resistance to noise and interference. An example of a communication system employing multiple modulation schemes is found in U.S. Pat. No. 5,577,087. Therein, a technique for switching between 16QAM and QPSK is described. The decision to switch between modulation types is made based on quality measurements, however this system employs a constant user bit rate which means that a change in modulation scheme also requires a change in channel bit rate, e.g., the number of timeslots used to support a transmission channel.

It is envisioned that many different combinations of these processing techniques may be selectively employed both as between different connections supported by a radiocommunication system and during the lifetime of a single connection. However, there will then be a need for some type of "handshaking" between the transmitting and receiving entities to inform the receiving entity of a transmission mode being employed and/or for the receiving entity to request a particular transmission mode from the transmitting entity. For example, there are two general categories of techniques for informing a receiver about processing techniques associated with a radio signal: (1) explicit information, i.e., a message field within the transmitted information having a mode value that is indicative of the processing type(s) and (2) implicit information, which is sometimes referred to as "blind" decoding, whereupon the receiver determines the processing performed by the transmitter by analyzing the received signal. This latter technique is employed in CDMA systems operating in accordance with the TIA/EIA IS-95 standard. Explicit information is sometimes considered to be preferable because it reduces processing delay at the receiver, but comes at the cost of the need for the transmitter to include additional overhead bits along with the user data.

Of particular interest for the present invention are mode indicators which reflect the transmitter's currently employed speech coding/channel coding combination and mode requests which reflect the receiver's request for a particular speech coding/channel coding mode to be employed. For example, when channel conditions are good, the receiver may send a mode request in the uplink for a speech coding/channel coding mode which provides for a high source coding bit rate and a relatively low degree of error protection. When the transmitter transmits information using the requested mode, it will also include a corresponding mode indicator in its downlink transmissions.

Alternatively, when channel conditions are poor, then a coding mode which provides a low bit rate speech coding technique coupled with a relatively high degree of error protection may be requested by the receiver. The transmitter would then provide a corresponding indicator associated with this other mode in the return link. Systems can rapidly change between these different coding modes based upon varying changes in channel conditions, so the mode requests and/or indicators need to be transmitted relatively frequently.

Thus, mode indicators and mode requests are communicated between transmitting and receiving entities to enable variable codec mode operation. Typically, these mode indicators/requests may include just a few, e.g., two, bits which are conveyed along with the data fields. Thus, it will be appreciated that it is particularly important for the receiver/transmitter to be able to accurately and rapidly decode the mode indicator/request since, otherwise, an entire frame of data may be unrecoverable by the receiver or a sub-optimal transmission mode may be employed. This desire for accurate and rapid reception of the mode indicator/request may lead designers to strongly protect the mode indicator/request with heavy channel coding.

However, usage of heavy channel coding implies higher redundancy, which means more bits to be transmitted for the mode indicator and/or request field. This is, as explained earlier, undesirable since overhead bits should be minimized, not increased. Thus, it would be desirable to provide techniques and systems for increasing the likelihood that mode indicators and requests, such as the coding mode indicator and request, will be properly decoded, while at the same time minimizing the number of overhead bits which are transmitted with the payload data and reducing the delay associated with processing mode information.

SUMMARY

These and other drawbacks and limitations of conventional methods and systems for communicating information are overcome according to the present invention, wherein the rate of transmission of mode information is decimated to reduce the bandwidth utilization associated therewith and/or permit heavier channel coding of the mode information.

The mode information may comprise, for example, a mode indicator which informs a receiver of the combination of speech coding/channel coding currently used to encode the payload data, a mode request which informs a transmitter of a particular codec mode desired by a receiver for subsequently transmitted information blocks or frames and/or channel measurement information, which acts as an implicit request for a particular codec mode to be provided by the transmitter. According to exemplary embodiments of the present invention, the rate of change of mode information is constrained to be less than every frame. For example, the mode indication and mode requests can be constrained to change no more than once every other frame. Under these circumstances, the transmission of mode indicators and mode requests can also be alternated to reduce the transmission capacity used by these indicators and minimize processing delays associated with mode changes.

According to other exemplary embodiments of the present invention, when links become inactive, e.g., when a speaker becomes silent, the transmission of mode information can be further reduced or adjusted in accordance therewith.

BRIEF DESCRIPTION OF THE DRAWINGS

These and other objects, features and advantages of the present invention will become more apparent upon reading from the following detailed description, taken in conjunction with the accompanying drawings, wherein:

FIG. 4 depicts a block diagram of a receiver including a mode likelihood processor and a mode information model;

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system is only described herein to the extent necessary for understanding the present invention. Although, the present invention is described in terms of exemplary embodiments in a GSM system, those skilled in the art will appreciate that the present invention could be used in a wide variety of other digital communication systems, such as those based on PDC or D-AMPS standards and enhancements thereof.

Figure 1:
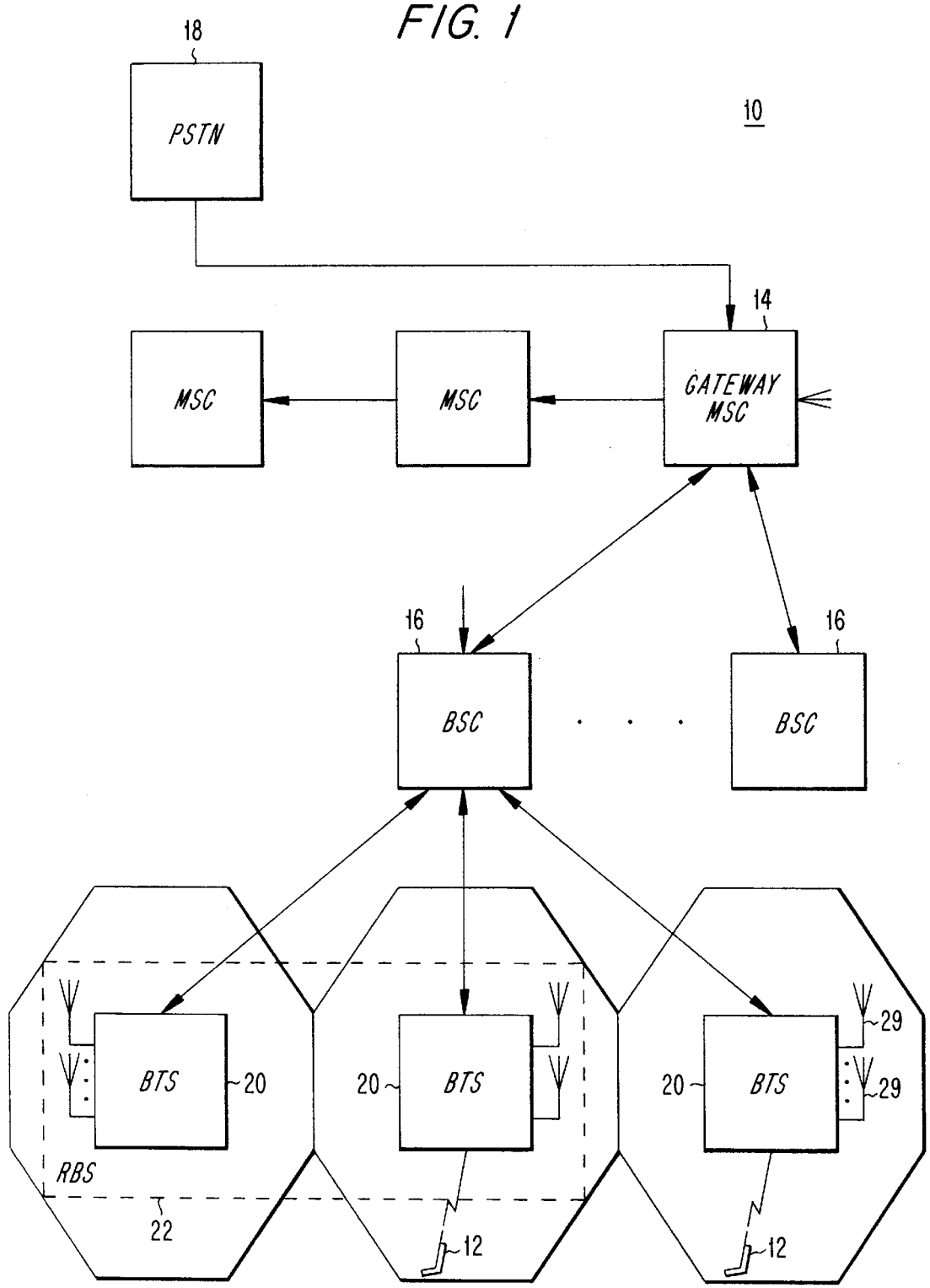
FIG. 1 is a block diagram of an exemplary GSM communication system which advantageously uses the present invention.

Referring to FIG. 1, a communication system 10 according to an exemplary embodiment of the present invention is depicted. The system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14 are responsible for the routing of calls from an originator to a destination. In particular, these entities are responsible for setup, control and termination of calls. One of the MSCs 14, known as the gateway MSC, handles communication with a Public Switched Telephone Network (PSTN) 18, or other public and private networks.

At a lower hierarchical level, each of the MSCs 14 are connected to a group of base station controllers (BSCs) 16. Under the GSM standard, the BSC 16 communicates with a MSC 14 under a standard interface known as the A-interface, which is based on the Mobile Application Part of CCITT Signaling System No. 7.

At a still lower hierarchical level, each of the BSCs 16 controls a group of base transceiver stations (BTSs) 20. Each BTS 20 includes a number of TRXs (not shown) that use the uplink and downlink RF channels to serve a particular common geographical area, such as one or more communication cells 21. The BTSs 20 primarily provide the RF links for the transmission and reception of data bursts to and from the mobile stations 12 within their designated cell. In an exemplary embodiment, a number of BTSs 20 are incorporated into a radio base station (RBS) 22. The RBS 22 may be, for example, configured according to a family of RBS-2000 products, which products are offered by Telefonaktiebolaget L M Ericsson, the assignee of the present invention. For more details regarding exemplary mobile station 12 and RBS 22 implementations, the interested reader is referred to U.S. patent application Ser. No. 08/921,319, entitled "A Link Adaptation Method For Links using Modulation Schemes That Have Different Symbol Rates", to Magnus Frodigh et al., and filed on Aug. 29, 1997, the disclosure of which is expressly incorporated here by reference.

According to exemplary embodiments of the present invention, information transmitted between a BTS 20 and a mobile station 12 can be processed according using different codec modes. The phrase "codec mode" as it is used herein refers to a combination of source coding (e.g., speech coding) and channel coding, although the present invention is also applicable to the transmission and reception of other types of mode information and, even more generally, to the transmission and reception of other information over an air interface. To more fully understand the exemplary modes for which indicators, requests and information associated therewith can be protected, transmitted and decoded, consider the exemplary GSM codec mode illustrated in FIGS. 2(a) and 2(b).

Figure 2A:
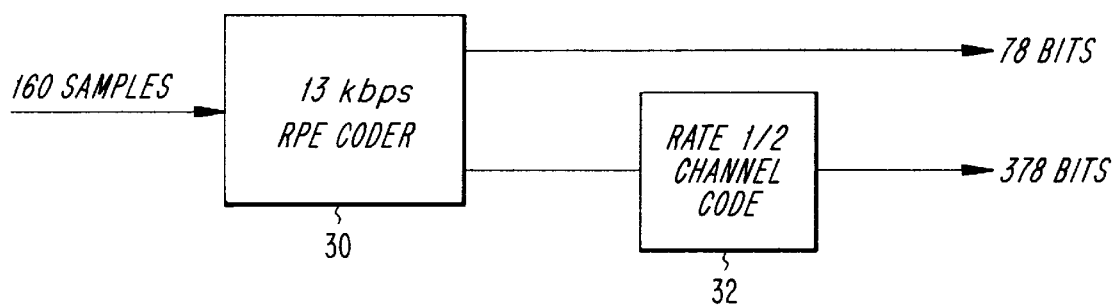
FIG. 2(a) depicts a codec mode used in a conventional GSM system.
Figure 2B:
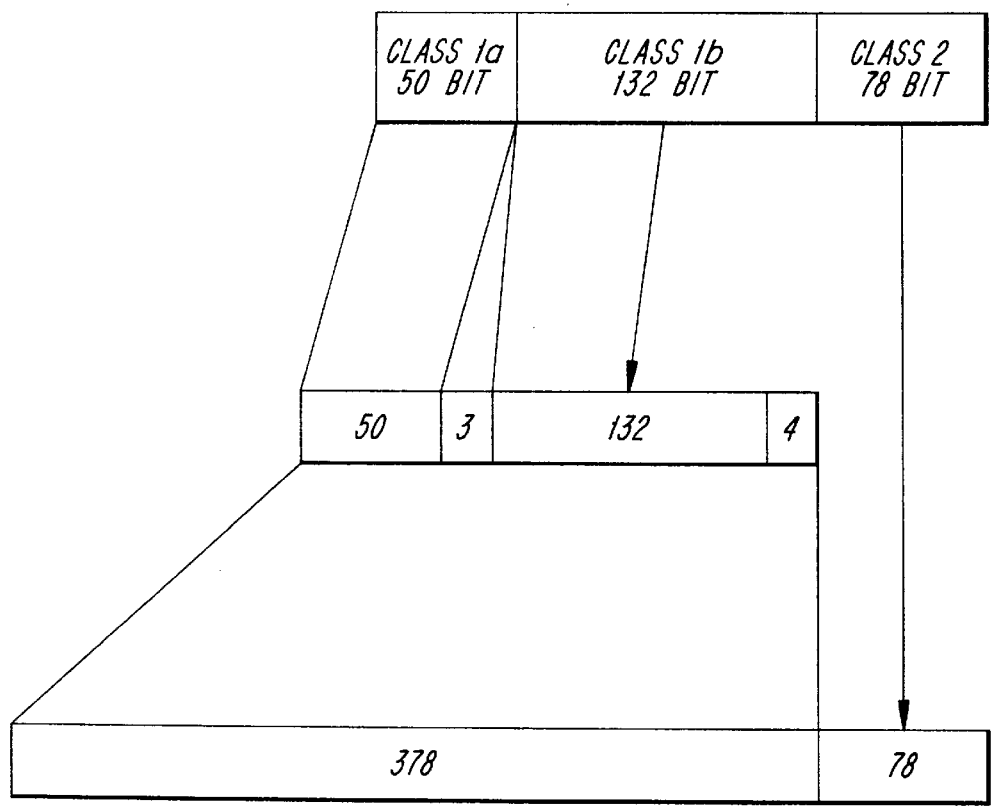
FIG. 2(b) depicts a conventional mapping of bits in a speech frame for unequal error protection coding.

FIG. 2(a) depicts a portion of the transmit signal processing path downstream of the A/D converter (not shown) which digitizes an exemplary input audio signal. A block of 160 samples is presented to an RPE speech coder 30 which operates in accordance with the well known GSM specifications (e.g., GSM 06.53) to produce two categories of output bits, 182 class 1 bits and 78 class 2 bits, for a total output bit rate of 13 kbps. As seen in FIG. 2(b), the class 1 bits are further divided into class 1a bits and class 1b bits, both of which are input to a channel coder 32, which performs rate ½ convolutional encoding. This results in an output of 378 bits from the channel coder 32, including 3 parity bits associated with the class 1a bits and four tail bits associated with the class 1b bits. This composite process can be considered to be one example of a single codec mode.

However, Applicants envision future systems that provide for a plurality of different codec modes. For example, as conceptually illustrated in FIG. 3(a), there may be two different speech coders and two different channel coders which can be used in various combinations to encode bits prior to transmission. A first speech coder 40 may operate to process digital samples and provide an output bit rate of X kbps, while a second speech coder 42 may process the input digital samples to provide an output bit rate of Y kbps, where X>Y. Similarly, two different channel coders 44 and 46 (in this example convolutional coders, although one or both could alternatively be block coders) provide different degrees of error protection by virtue of their different rates 1/A and 1/B, respectively, where A>B. Thus, it can be seen that by using mode control processor 48 in conjunction with multiplexors 50 and 52 to select a path, i.e., a combination of speech coder and channel coder for this example, for processing a particular block or frame of payload data, four different codec modes are available.

Many other techniques are, of course, available to create multiple codec modes in a transmitter. Consider the example in FIG. 3(b), wherein a plurality of source (e.g., speech) coders 60, 62, 64, and 66 are provided in selectable transmit signal processing paths. Each coder has a different output rate (X>Y>Z>A kbps) and is associated with a different one of the channel coders 68, 70, 72 and 74. To provide a uniform output data rate of F kbps as between the different, selectable paths (which may be desirable for similar resource allocation/connection), the channel coders may be designed so that the amount of redundancy added to the source coded data stream is higher for the lower bit rate source coder and lower for the higher bit rate source coders. As in the earlier example, the particular codec mode selected for any given data block or frame is controllable by, for example, a mode control processor 76 and multiplexor 78.

Figure 3A:
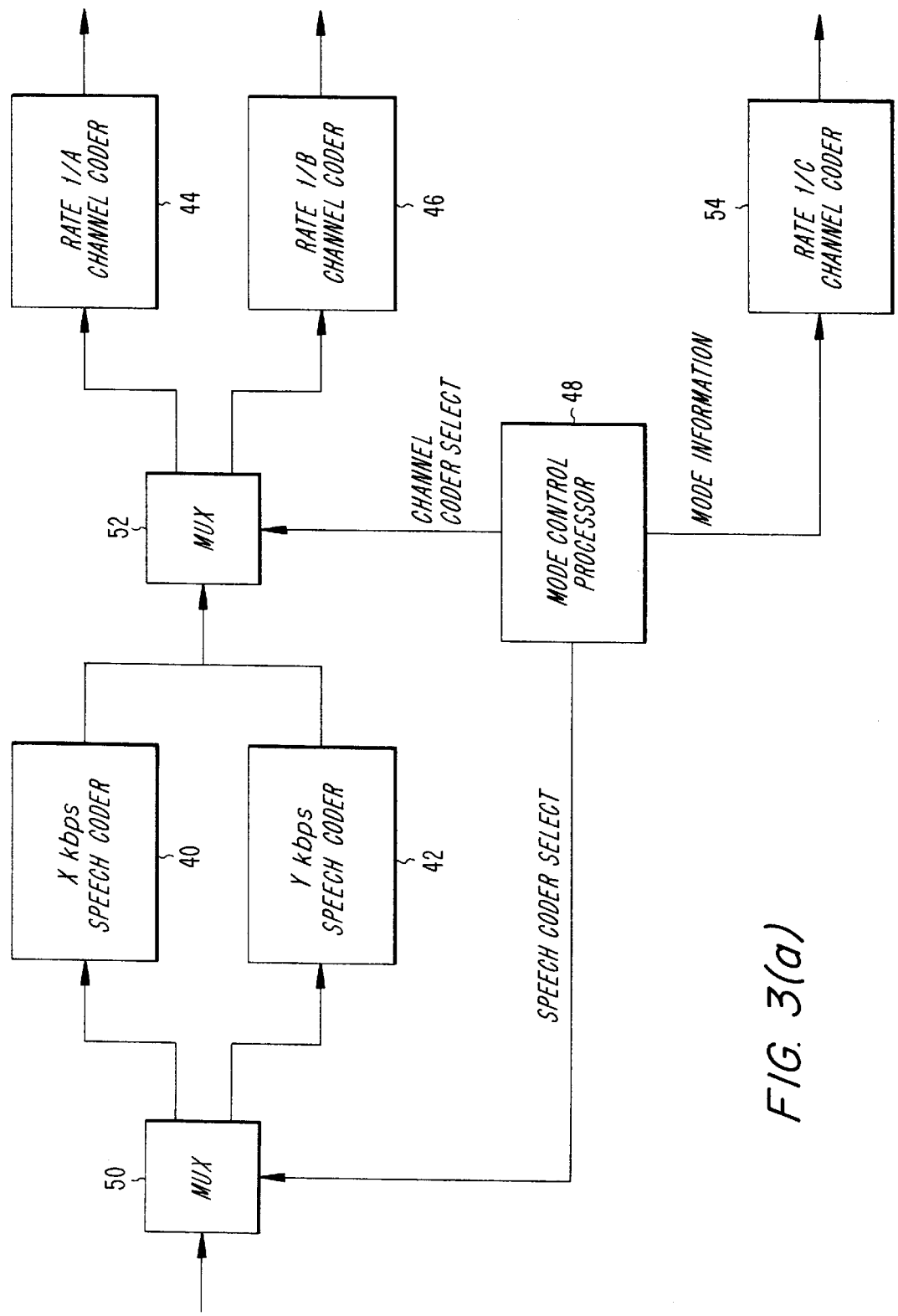
FIG. 3(a) is a block diagram illustrating multiple codec modes, individual ones of which can be selected for processing data to be transmitted and a corresponding mode indicator according to an exemplary embodiment of the present invention.
Figure 3B:
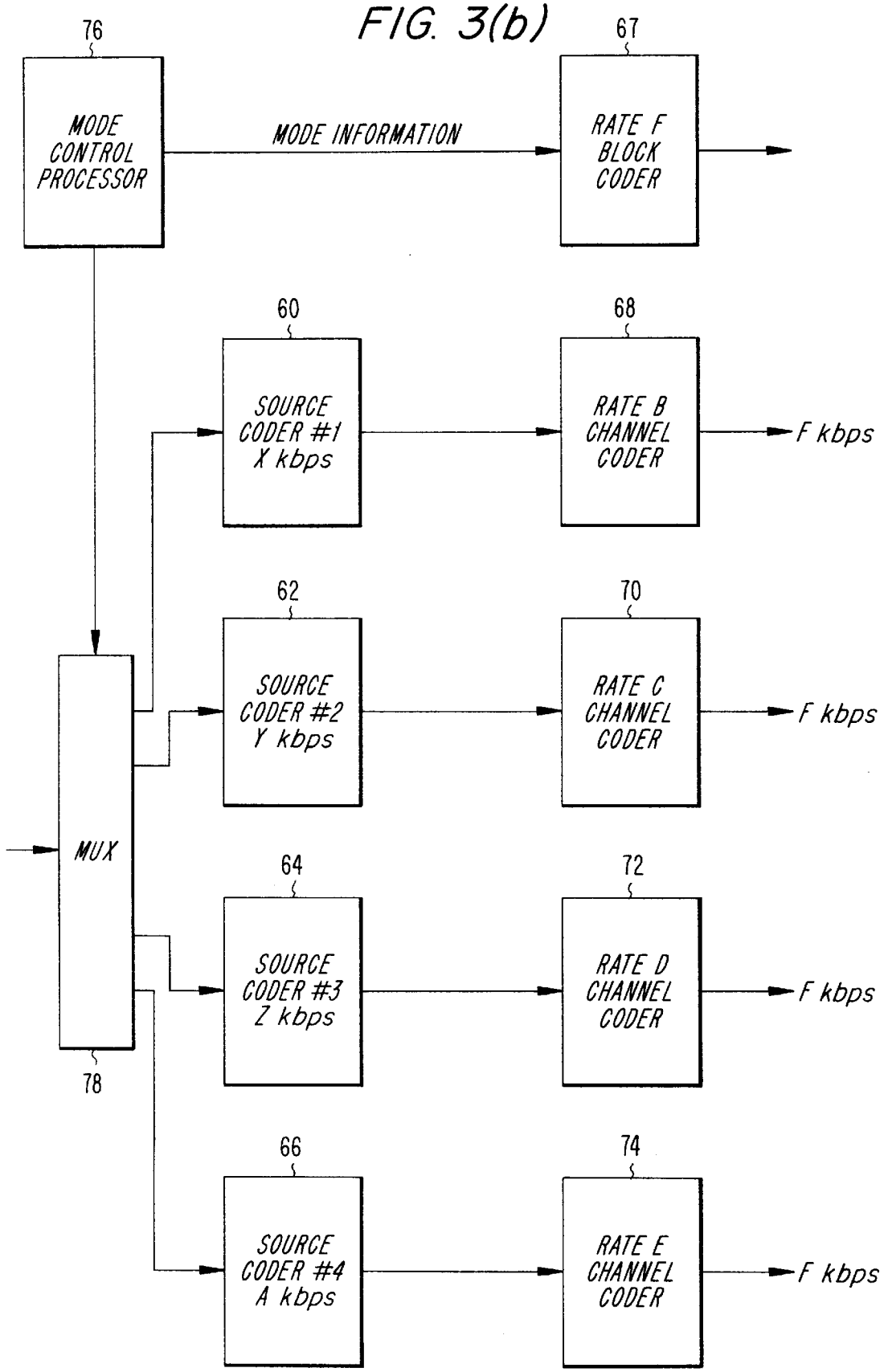
FIG. 3(b) is another block diagram illustrating another exemplary technique for generating multiple codec modes.

Regardless of the technique used at the transmit side to provide different codec modes, in order to be able to correctly decode the received data, a receiver will need to know the codec mode used by the transmitter to process any given block or frame of received data. According to exemplary embodiments of the present invention, this can be accomplished by transmitting a mode indicator from the transmitter to the receiver in conjunction with, or in advance of, the block or frame of data to which it relates. In the example of FIGS. 3(a) and 3(b), a two bit mode indicator field would suffice to inform the receiver of the combination of speech coder and channel coder used to process data prior to transmission. Additionally, the receiver may transmit a request for a particular codec mode to the transmitter in the return radio link or the receiver may transmit signal quality measurements associated with the downlink channel (i.e., BTS to mobile station link) to the transmitter which the transmitter then uses to identify an appropriate codec mode. In any of these three cases, some type of mode information is exchanged between the transmitter and the receiver over the air interface, which phrase is used to include each of these three specific examples, as well as other types of mode information.

In any event, since the mode information is also communicated over the air interface between the BTS 20 and the mobile station 12, it should also be protected against channel errors as well as the data. However, adding heavy channel coding, i.e., with a large amount of redundancy, is not desirable since it adds further to overhead (i.e., non-payload data) transmissions and reduces the user's effective bit rate. It is also desirable to maintain low coding delay so that codec modes can be changed quickly to account for rapid changes in transmission channel conditions.

According to the above-identified, related patent application, these objectives may be achieved by encoding the mode information with a relatively weak (i.e., with a small amount of redundancy) channel code. In FIG. 3(a), this is exemplified by channel coder 54 which employs a rate 1/C convolutional code. In FIG. 3(b), this is exemplified by a block coder 67 employing (8,2) block coding. However, the present invention addresses the capacity consumption issue associated with the transmission of mode information by reducing the rate of change of certain mode information as will be described below.

At the receiver side, as exemplified by the block diagram of FIG. 4, an antenna 100 of the receiver apparatus, for instance, receives radio signals over a certain radio channel. The signals (e.g., data/speech messages) transmitted over this channel may become strongly distorted, for, instance due to fading, so that the TDMA-bursts give rise to a highly distorted speech frame.

Demodulation takes place in the radio receiver 102 at a given radio frequency (in the GSM-system 865–935 MHZ) in a known manner, so as to obtain a baseband modulated signal. The signal strength level(s) of the radio signals incoming to the radio receiver 102 can be measured and are referenced $s_m$ in FIG. 4. The baseband modulated signal is demodulated in the demodulator 104 within the IF-range, this demodulator also including an equalizer for compensating or correcting the multipath propagation to which the incoming signal has been subjected during transmission, in a known manner. For example, the well known Viterbi equalizer can be used for this purpose.

So-called soft information associated with the likelihood of any given symbol estimate is obtained from the Viterbi equalizer in the demodulator 104, this soft information being referenced $s_j$ in FIG. 4. A deinterleaver 106 is connected downstream of the demodulator/equalizer 104 and recovers the time divided bursts intended for the receiver, in a known manner.

The receiver also includes a mode indication decoder 107 that operates to identify a codec mode based upon received mode information. The mode indication decoder provides an output to the channel decoder 109 and the speech decoder 112, indicating the techniques used by the transmitter to process the received data block or frame prior to transmission. Exemplary techniques for implementing the mode indication decoder 107 can be found in the above-identified and incorporated by reference application and, accordingly are not further described here.

Figure 5:
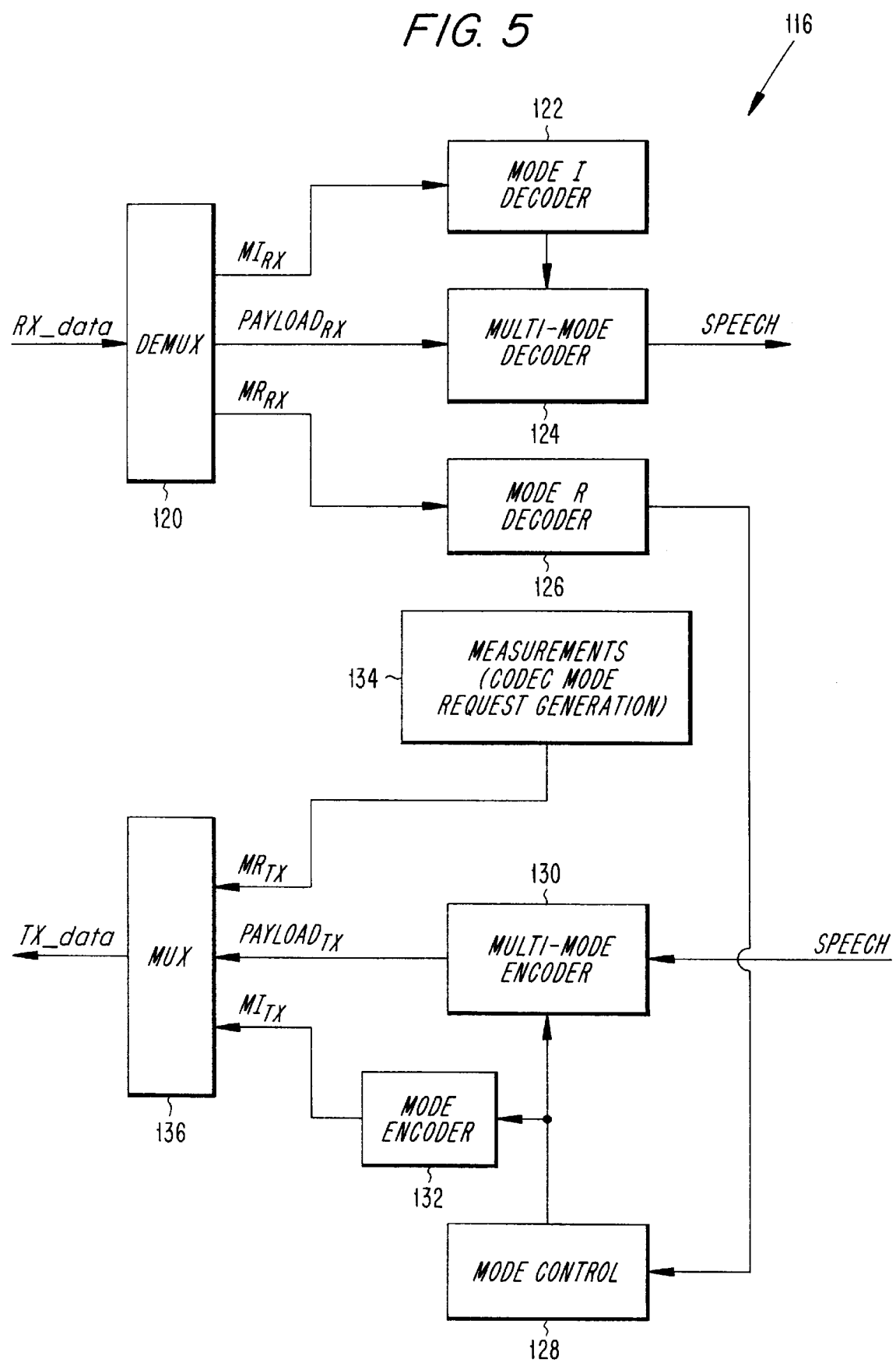
FIG. 5 is a block diagram of an exemplary transceiver according to the present invention.

More generally, a transceiver (either in a remote device or at the network side) according to the present invention will include functionality for transmitting mode indication information, transmitting mode request information, receiving mode indication information and receiving mode request information as represented by the block diagram of FIG. 5. Therein, RX_data received by a transceiver 116 on a first link is separated into its component fields and provided to an appropriate decoding block or algorithm by demultiplexor 120. For simplicity in describing the present invention, FIG. 5 refers only to mode and payload information, although those skilled in the art will appreciate that other types of information may be received by the transceiver.

If the received frame includes mode indication information, then that information is provided to the mode indication decoder 122, which determines the codec mode used to encode the received payload data. The decoded mode indication information is provided to multi-mode decoder 124 so that properly decoded payload data, e.g., speech, can be output. If, on the other hand, the received frame includes mode request information, then that information is provided to the mode request decoder 126. The mode request decoder determines the codec mode requested by the other transceiver (not shown), which information is then forwarded to the transmitter side of this transceiver.

On the transmit side, the requested mode is presented to mode control unit 128 which selects an appropriate codec mode for processing incoming payload, e.g, speech, information. This mode information is passed to a multi-mode encoder 130 which, for example, speech encodes and error correction encodes incoming speech frames. The mode information is also passed to the mode encoder 132 which creates a mode indication to be transmitted to the other transceiver (not shown) on a second (return) link which identifies the mode employed by the multi-mode encoder 130. Additionally, the transmit side of transceiver 116 includes a measurement or codec mode request function 134 which, for example based on the measured quality on the first link, provides a mode request or measurement information to be transmitted on the second link. The mode request, payload information and mode indication are presented to multiplexor 136 for selective transmission using well known techniques, e.g., modulation, upconversion, etc. According to exemplary embodiments of the present invention, the tension between protecting the mode information against transmission errors and providing low delay, on the one hand, and reducing the amount of bandwidth consumed by the transmission of mode information, on the other hand, is resolved by decimating the permissible change rate associated with mode information and alternating the transmissions of the mode indicators and transmissions of the mode requests (or measurement information). This can be accomplished in a number of different ways according to exemplary embodiments of the present invention.

For example, the codec mode changes at the transmitting entity can be constrained to occur only every n-th frame. As a result of this constraint, codec mode indications will only change at a decimated rate of once per n frames, where, for example, n can be equal to 2 or a multiple thereof. Similarly, codec mode requests generated by the receiver can be subsampled with a decimation factor of n, the result being that codec mode requests can only change at a maximum rate of once per n frames. These constraints on the changeability of the mode indications and mode requests can, in turn be used to alternate the transmission of mode indications and mode requests whereby the total bandwidth consumed by the transmission of mode information can be reduced by a factor of 1/n.

Figure 6:
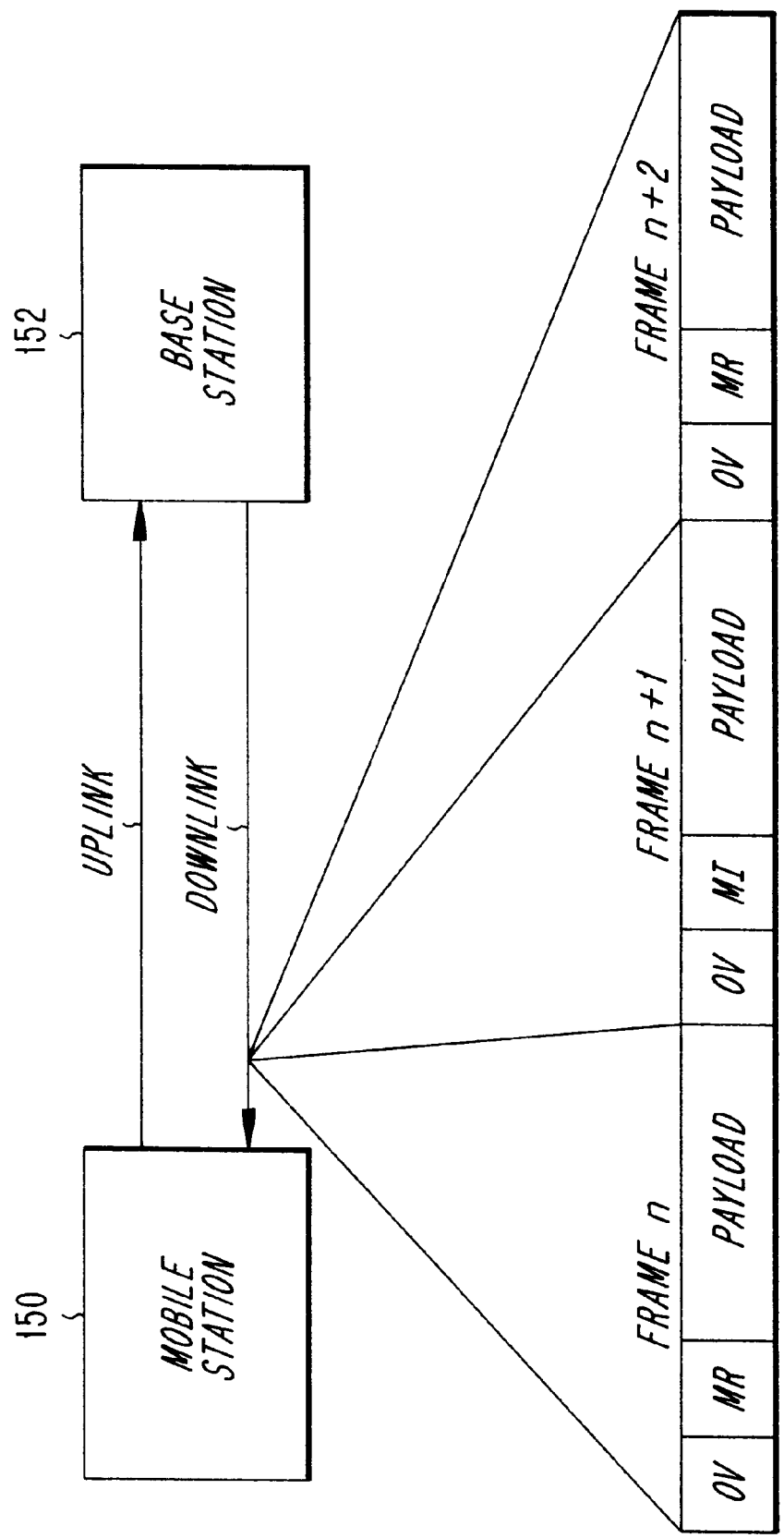
FIG. 6 illustrates alternating transmission of mode indicators and mode requests according to an exemplary embodiment of the present invention.

Consider the example illustrated in FIG. 6 with respect to communications between an exemplary GSM mobile station 150 and base station 152. Therein, the mobile station 150 transmits information to the base station 152 on the uplink and receives information transmitted by the base station on the downlink. For the purposes of this example, the alternating transmission characteristic of mode information received by e.g., transceiver 116, according to the present invention is illustrated on the downlink. Therein, the information contained in several consecutive channel frames (after deinterleaving to simplify the illustration) are shown. In particular, in frame n, mobile station 150 receives a mode request (MR) from the base station 150 indicating the codec mode with which the mobile station should transmit to the base station on the uplink. Since no mode indication is transmitted in frame n, the mobile station continues to decode information using the codec mode indicated in frame n−1 (not shown). Analogously, since no mode request information is transmitted in frame n+1, the mode request from frame n remains valid for frame n+1.

In frame n+1, however, the base station 152 transmits a mode indication(MI) instead of a mode request. Thus, the mobile station uses this mode information to switch codec modes (if a new codec mode is indicated) to decode the payload information found in this (and/or a subsequent) frame. Then, in frame n+2, this link once again contains a mode request which is decoded by the mobile station 150 and used in its transmit side processing as described above with respect to FIG. 5. As indicated in FIG. 6, each frame may also include other overhead information including, for example, synchronization information. Those skilled in the art will further appreciate that, although not explicitly described here, the mobile station 150 can similarly alternate transmissions of mode requests and mode indications to the base station 152 on the uplink. Moreover, although not explicitly illustrated in FIG. 6, note that the mode information MI and MR may occupy the same bit positions within each frame.

In an even more specific, yet purely illustrative example, the mode information in the previous example may comprise eight gross bits (full rate, four gross bits half rate) and the decimation factor n equals two. Mode requests are transmitted on even frames and mode indications on odd frames. After diagonal interleaving, the gross bits belonging to each code word are distributed individually on separate bursts, thereby providing optimum interleaving gain for frequency hopping channels.

By transmitting the mode indications and mode requests in only every other frame, for example, the total bandwidth for transmitting these overhead fields is reduced by a factor of two, regardless of the amount of redundancy added by virtue of the error correction coding. The particular manner used to select the alternating pattern may, of course, be varied. For example, consecutive codec mode requests may be transmitted using frames (1 . . . n/2)+k*n, where k is an integer value. Then, codec mode indications would be transmitted using frames (n/2+1 . . . n)+k*n. Alternatively, codec mode requests can be sent only using odd-numbered frames, while mode indications can be sent only using even-numbered frames although this latter solution may increase the transmission delay.

Since these exemplary embodiments of the present invention provide for alternating the transmission of mode indications and mode requests, it is important that some form of synchronization of mode information transmission/decoding be provided so that a receiving entity knows when it is receiving a mode indication and when it is receiving a mode request. Otherwise, erroneous decoding of the mode information may occur. One way to provide synchronization for the mode information is to align the transmission of mode information to the time frame structure of the radiocommunication system. For example, in the GSM system, the mode information could be aligned with the SACCH (Slow Associated Control Channel) such that, e.g., mode indications are sent in even frames relative to the SACCH while mode requests are sent using odd frames. Alternatively, when both links are active, it could be understood that the first transmission will always be a specified one of the mode request or mode indication.

According to other aspects of the present invention, the usage of discontinuous transmission (DTX) or voice operated transmissions (VOX) in some radiocommunication systems can be accounted for in conjunction with the transmission of mode information. DTX and VOX are mechanisms for transmitting frames of information only during speech periods while the transmitter is switched off during speech inactivity to reduce power consumption and interference. In two-way communication systems employing DTX, there can thus occur the situations where both links are active (e.g., when the active speaker during a conversation changes), one link active/one link inactive or both links inactive. The transmitters having inactive links typically still transmit some information, commonly referred to as silence descriptor (SID) frames or comfort noise information, that allows the receiver to generate an appropriate background noise output rather than the listener experiencing pops and cracks associated with a complete absence of reproduced sound. However these SID frames are transmitted with a reduced frame transmission rate relative to active speech frames.

In addition to SID frames, in the types of systems described above, mode information also needs to be transmitted. However, instead of alternating mode information as described above, the occurrence of inactive links can be recognized and used by the system to further reduce the transmission of mode information. For example, mode indications need not be transmitted for inactive links since coded speech frames are not included therewith. Consider the case where a mobile station is not currently transmitting to a base station on the uplink, but is receiving speech frames (or other data) on the downlink. Then, the mobile station need not send mode indications on the uplink and can, instead, only send mode requests associated with transmissions to be made to it by the base station on the currently active downlink. Analogously, on the active link codec mode requests for transmissions on the inactive link do not need to be sent until the inactive link becomes active again. Having eliminated the need to transmit mode indications on the inactive link and mode requests on the active link, the bandwidth released thereby can be used in a number of different ways. For example, mode requests can be repeated, e.g., on every sent SID frame, on the inactive link and mode indications can be repeated on the active link, which leads to improved channel error protection. Alternatively, some other type of overhead information can be transmitted during the omitted mode information fields.

In the situation where both links are inactive, transmission of all mode information may be temporarily suspended pending reactivation of one or both links. The corresponding transmission capacity is then free for other uses, e.g., the transmission of other overhead information. Alternatively, mode requests may continue to be transmitted on the inactive link(s) as indicators of the current quality of the channel. Then, when the inactive link becomes active, these mode requests can be used to select an appropriate codec mode for coding the next frame of information to be transmitted.

If mode requests associated with inactive links are not transmitted to use the transmission capacity for other purposes, then, when an inactive link becomes active again, some other technique must be employed to determine which codec mode to use initially until the receiving entity begins to return mode requests in the other link. Several possibilities exist. For example, the transmitting entity can use a predetermined n-th most robust codec mode, where n=1 implies a codec mode having a greatest level of error correction protection. If this solution is used, then no mode indication need be transmitted with this initial frame or frames of information since the receiving entity will know a priori which mode is being used for transmission after inactivity.

Another alternative for post-inactivity selection of a codec mode is to use the same codec mode currently being used for the active link. For example, if a mobile station is inactive on the uplink and active on the downlink, once it prepares another frame for transmission on the uplink, it can select the codec mode currently being used to decode received frames on the downlink from the base station. This solution is based on the recognition that there is a certain correlation between the characteristics of the uplink channel and the downlink channel in a duplex pair. As in the previous exemplary embodiment, the receiving entity knows the applied codec mode as it is the same mode that it is employing to transmit frames of information on the other link. A variation on this solution is to employ, instead of the same mode being used on the active link, a mode which is n modes more robust than the mode being used on the active link, e.g, the next most robust mode, assuming that a more robust mode exists. Taking the exemplary modes illustrated in FIG. 3(b), if the active link is currently using a codec mode defined by the combination of source coder 62 and rate C channel coder 70, then (for n=1) the previously inactive link would use the next most robust codec mode provided by source coder 64 and channel coder 72 to transmit its first frame of information.

Yet another alternative for selecting a codec mode after a period of transmission inactivity is to select the mode used to transmit on that link prior to the inactivity. This solution can be useful particularly in situations wherein the radio channel conditions are not rapidly changing. As in the previous exemplary embodiment, this technique can be varied by using, instead of the same previously employed codec mode, a codec mode that is n modes more robust, e.g., the next most robust mode.

Although the invention has been described in detail with reference only to a few exemplary embodiments, those skilled in the art will appreciate that various modifications can be made without departing from the invention. For example, although previously described exemplary embodiments of the present invention alternate transmissions of mode information after decimating the change rates, other transmission patterns may be selected. Thus, the present invention can be implemented by sending a portion of both mode request information and mode indication information in each frame. Accordingly, the invention is defined only by the following claims which are intended to embrace all equivalents thereof.

What is claimed is:

1. A method for transmitting information on a first link and receiving information on a second link in a communication system comprising the steps of:
   providing at least two different codec modes for processing said information in said system;
   transmitting, in a first set of frames, including frames $(n/2+1 \ldots n)+k*n$, where k is an incremental frame number and n is an integer, on said first link, a mode indication identifying one of said at least two different codec modes which has been used to process the data of said first set of frames; and
   transmitting, in a second set of frames on said first link different than said first set of frames, a mode request identifying one of said at least two different codec modes to be used to process information to be transmitted on said second link.

2. The method of claim 1, wherein each of said at least two codec modes identify both a source coding technique and a channel coding technique.

3. The method of claim 1, wherein said mode request is channel measurement information which can be used by a transceiver to determine an appropriate one of said at least two different codec modes for processing information to be transmitted on said second link.

4. The method of claim 1, wherein said at least one first and second frames are consecutively transmitted.

5. The method of claim 1, wherein said second step of transmitting further comprises the step of:

transmitting said mode request information in said second set of frames, including frames $(1 \ldots n/2)+k*n$, where k is an incremental frame number and n is an integer.

6. The method of claim 1, further comprising the step of:
synchronizing said first and second transmitting steps to a time frame structure of other information transmitted by said communication system.

7. The method of claim 6, wherein said time frame structure is a slow associated control channel (SACCH) structure.

8. A system for transmitting information on a first link and receiving information on a second link in a communication system comprising the steps of:
   means for providing at least two different codec modes for processing said information in said system;
   means for transmitting, in a first set of frames, including frames $(n/2+1 \ldots n)+k*n$, where k is an incremental frame number and n is an integer, on said first link, a mode indication identifying one of said at least two different codec modes which has been used to process the data of said first set of frames; and
   means for transmitting, in a second set of frames on said first link different than said first set of frames, a mode request identifying one of said at least two different codec modes to be used to process information to be transmitted on said second link.

9. The system of claim 8, wherein each of said at least two codec modes identify both a source coding technique and a channel coding technique.

10. The system of claim 8, wherein said mode request is channel measurement information which can be used by a transceiver to determine an appropriate one of said at least two different codec modes for processing information to be transmitted on said second link.

11. The system of claim 8, wherein said at least one first and second frames are consecutively transmitted.

12. The system of claim 8, wherein said second means for transmitting further comprises:
   means for transmitting said mode request information in said second set of frames including frames $(1 \ldots n/2)+k*n$, where k is an incremental frame number and n is an integer.

13. The system of claim 8, further comprising:
   means for synchronizing said first and second transmitting means to a time frame structure of other information transmitted by said communication system.

14. The system of claim 13, wherein said time frame structure is a slow associated control channel (SACCH) structure.

15. A communication station comprising:
   a processor for processing payload information and mode indication and request information;
   and a transmitter for receiving said payload information, said mode indication information and said mode request information from said processor, wherein said transmitter is configured to:
   transmit, in a first set of frames, including frames $(n/2+1 \ldots n)+k*n$ where k is an incremental frame number and n is an integer, on a first link, a mode indication identifying one of at least two different codec modes which has been used to process the data of said first set of frames; and
   transmit, in a second set of frames on said first link different from said first set of frames a mode request identifying one of said at least two different codec modes to be used to process information to be transmitted on said second link.

16. The communication station of claim 15, further comprising:
a receiver for receiving mode indication information, mode request information and payload information on a second communication link, wherein said mode indication information is used by said processor to decode said payload information and said mode request information is used to determine a coding mode for said payload information transmitted by said transmitter.

17. The communication station of claim 15, wherein said processor selectively adapts transmission of said mode indication information based upon incoming payload information.

18. The method of claim 1, further comprising the steps of:
determining that a data source associated with said first link is inactive; and
halting the transmission of said mode indications in said at least one first frame during a period when said data source is inactive.

19. A method for transmitting information on a first link and receiving information on a second link in a communication system comprising the steps of:
providing at least two different codec modes for processing said information in said system;
transmitting, in a first set of frames on said first link, a mode indication identifying one of said at least two different codec modes which has been used to process the data of said first set of frames;
transmitting, in a second set of frames on said first link different than said first set of frames, a mode request identifying one of said at least two different codec modes to be used to process information to be transmitted on said second link;
determining that a data source associated with said first link is inactive;
halting the transmission of said mode indications in said first set of frames during a period when said data source is inactive; and
transmitting said mode requests both during said first and second set of frames during said period of inactivity.

20. The method of claim 18, further comprising the step of:
using a predetermined n-th most robust one of said at least two different code modes to process said information for transmission on said first link after said period of inactivity has ended.

21. The method of claim 18, further comprising the step of:
using a codec mode which was used prior to said period of inactivity to process said information for transmission on said first link after said period of inactivity has ended.

22. The method of claim 18, further comprising the step of:
using a codec mode which is n modes more robust than a codec mode employed immediately before said period of inactivity to process said information for transmission after said period of inactivity has ended.

23. The system of claim 8, further comprising:
means for determining that a data source associated with said first link is inactive; and
means for halting the transmission of said mode indications in said at least one first frame during a period when said data source is inactive.

24. A system for transmitting information on a first link and receiving information on a second link in a communication system corn rising the steps steps of:
means for providing at least two different codec modes for processing said information in said system;
means for transmitting, in a first set of frames on said first link, a mode indication identifying one of said at least two different codec modes which has been used to process the data of said first set of frames;
means for transmitting, in a second set of frames on said first link different than said first set of frames a mode request identifying one of said at least two different codes modes to be used to process information to be transmitted on said second link;
means for determining that a data source associated with said first link is inactive;
means for halting the transmission of said mode indications in said a first set of frames during a period when said data source is inactive; and
means for transmitting said mode request during both said first and second set of frames during said period of inactivity.

25. The system of claim 23, further comprising:
means for using a predetermined n-th most robust one of said at least two different code modes to process said information for transmission on said first link after said period of inactivity has ended.

26. The system of claim 23, further comprising:
means for using a codec mode which was used prior to said period of inactivity to process said information for transmission on said first link after said period of inactivity has ended.

27. The system of claim 22, further comprising:
means for using a codec mode which is n modes more robust than a codec mode employed immediately before said period of inactivity to process said information for transmission after said period of inactivity has ended.

28. A method for receiving information on a first link in a communication system comprising the steps of:
providing at least two different codec modes for processing said information in said system;
receiving, in a first set of frames, including frames $(n/2+1 \ldots n)+k*n$, where k is an incremental frame number and n is an integer, on said first link, a mode indication identifying one of said at least two different codec modes which has been used to process payload data; and
receiving, in a second set of frames on said first link different than said first set of frames, a mode request identifying one of said at least two different codec modes to be used to process information to be transmitted on a second link.

29. The method of claim 28, wherein each of said at least two codec modes identify both a source coding technique and a channel coding technique.

30. The method of claim 28, wherein said payload data is contained in a same received frame as said mode indication.

31. The method of claim 28, wherein said payload data is contained in a subsequent received frame different than said at least one first frame including said mode indication.

32. The method of claim 28, further comprising the steps of:
processing said payload data based on said received mode indication; and
during said at least one second frame, continuing to process additional payload data based on a previously received mode indication.

33. A method for transmitting information on a first link and receiving information on a second link in a communication system comprising the steps of:

providing at least two different codec modes for processing said information in said system;

transmitting, in a first set of frames, including frames (1 . . . n/2)*2+k*n, where k is an incremental frame number and n is an integer, on said first link, a mode indication identifying one of said at least two different codec modes which has been used to process the data of said first set of frames; and transmitting, in a second set of frames on said first link different than said first set of frames, a mode request identifying one of said at least two different codec modes to be used to process information to be transmitted on said second link.

34. A method in claim 33, wherein the second step of transmitting further comprises the step of:

transmitting said mode request information in said second set of frames, including frames 2*(1 . . . n/2)−1+k*n, where K is an incremental frame number and n is an integer.

35. A system for transmitting information on a first link and receiving information on a second link in a communication system comprising the steps of:

means for providing at least two different codec modes for processing said information in said system;

means for transmitting, in a first set of frames, including frames (1 . . . n/2)*2+k*n, where k is an incremental frame number and n is an integer, on said first link, a mode indicationr identifying one of said at least two different codec modes which has been used to process the data of said first set of frames; and means for transmitting, in a second set of frames on said first link different than said first set of frames, a mode request identifying one of said at least two different codec modes to be used to process information to be transmitted on said second link.

36. The system of claim 35, wherein said second means for transmitting further comprises:

means for transmitting said mode request information in said second set of frames, including frames 2*(1 . . . n/2)−1+k*n, where k is an incremental frame number and n is an integer.

37. The method of claim 28, further comprising the steps of:

determining that a data source associated with said first link is inactive; and halting transmission of mode requests on said second link during a period when said data source is inactive.

38. The method of claim 37, further comprising the step of:

transmitting mode indications on said second link both during said at least one first and second frame during said period of inactivity.

39. The method of claim 18, further comprising the step of:

using a codec mode which is n modes more robust than a codec mode used on said second link to process said information for transmission after said period of inactivity has ended.

40. The system of claim 18, further comprising:

means for receiving mode indications in every frame on said second link during said period of inactivity on said first link.

41. The system of claim 23, further comprising:

means for using a codec mode which is n modes more robust than a codec mode used on said second link to process said information for transmission after said period of inactivity has ended.

42. The method of claim 28, further comprising the steps of:

transmitting information on said second link, which information is processed in accordance with said received mode requests; and during said at least one first frame, continuing to process said information to be transmitted on said second link based on a previously received mode request.

43. The method of claim 1, wherein said at least one first and second frames are time frames associated with a time division multiple access (TDMA) structure.

44. The system of claim 8, wherein said at least one first and second frames are time frames associated with a time division multiple access (TDMA) structure.

45. The method of claim 18, further comprising the step of:

using a codec mode which is the same as a codec mode used on said second link to process said information for transmission after said period of inactivity has ended.

46. The system of claim 23, further comprising:

means for using a codec mode which is the same as a codec mode used on said second link to process said information for transmission after said period of inactivity has ended.

47. The method of claim 1, wherein said at least one first and second frames are time frames associated with the time frame structure of the employed source and channel coding processing.

48. The system of claim 8, wherein said at least one first and second time frames are time frames associated with the time frame structure of the employed source and channel coding processing.

* * * * *